(12) United States Patent
Wang et al.

(10) Patent No.: US 7,477,827 B2
(45) Date of Patent: Jan. 13, 2009

(54) VARIABLE OPTICAL ATTENUATOR

(75) Inventors: Miaoqing Wang, Shenzhen (CN); Yatao Yang, Plano, TX (US); Ting Xue, Tianjin (CN); Yunhui Sun, Shenzhen (CN)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 12/022,776

(22) Filed: Jan. 30, 2008

(65) Prior Publication Data

US 2008/0205845 A1     Aug. 28, 2008

Related U.S. Application Data

(60) Provisional application No. 60/887,967, filed on Feb. 2, 2007.

(51) Int. Cl.
*G02B 6/00* (2006.01)
(52) U.S. Cl. ................ 385/140; 385/14; 385/37; 385/129; 385/130; 385/131
(58) Field of Classification Search ............. 385/14, 385/37, 129–131, 140
See application file for complete search history.

(56) References Cited

U.S. PATENT DOCUMENTS

| | | | |
|---|---|---|---|
| 3,771,857 A * | 11/1973 | Thomasson et al. | ......... 359/587 |
| 4,093,346 A * | 6/1978 | Nishino et al. | ............... 348/292 |
| 6,167,185 A | 12/2000 | Smiley et al. | ............... 385/140 |
| 6,404,970 B1 * | 6/2002 | Gransden et al. | ............ 385/140 |
| 6,553,175 B2 * | 4/2003 | Jaspan | ........................ 385/140 |
| 6,636,666 B2 * | 10/2003 | Chan et al. | ..................... 385/37 |
| 6,801,354 B1 | 10/2004 | Payne et al. | .................. 359/291 |
| 2005/0068612 A1 * | 3/2005 | Wilson et al. | ............... 359/337 |

\* cited by examiner

*Primary Examiner*—Frank G Font
*Assistant Examiner*—Guy G Anderson
(74) *Attorney, Agent, or Firm*—Allen, Dyer, Doppelt, Milbrath & Gilchrist, P.A.

(57) ABSTRACT

A variable optical attenuator is disclosed, which attenuates a beam of light while preserving its polarization substantially independent of wavelength. The beam of light is attenuated by a filter patterned with a grating of blocking stripes with serrated edges, which partially block and partially transmit the beam of light, respectively. The serrated edges provide for low polarization dependent loss. Along a length of the filter, a mark to space ratio of blocking stripe and aperture widths increases. By a linear translation of the filter along its length attenuation can be varied to a desired value. A stepper motor with lead screw can provide a suitable linear translation to give the filter a latching property.

14 Claims, 8 Drawing Sheets

VARIABLE OPTICAL ATTENUATOR

CROSS-REFERENCE TO RELATED APPLICATIONS

The present invention claims priority from Provisional Patent Application U.S. No. 60/887,967 filed Feb. 2, 2007, which is incorporated herein by reference for all purposes.

TECHNICAL FIELD

The present invention relates to variable optical attenuators for attenuating the intensity of a beam of light, in particular to optical attenuators which preserve the polarization of the beam of light over a wide range of attenuation levels and wavelengths.

BACKGROUND OF THE INVENTION

Variable optical attenuators are widely used in optical telecommunications and other applications to regulate the optical power level of optical signals for equalization purposes or to manage the dynamic range and sensitivity of photodetectors in optical receivers. Means of realizing optical attenuation include the utilization of linear neutral density filters, attenuating prisms, beam blockers, tilting mirrors, and mechanisms for bending or off-setting optical fibers.

In a prior art solution, Smiley et al. (U.S. Pat. No. 6,167,185) disclose an adjustable optical attenuator that preserves the composition of polarization of a beam of light. The beam attenuator has a cross-section along a plane perpendicular to the direction of propagation of the collimated beam of light in the shape of a wedge. The attenuation is varied using a controller for moving the beam attenuator in order to vary a size of the portion of the wedge within the collimated beam of light.

FIG. 1 shows the adjustable optical attenuator 100 consisting of an opaque cone 101 partially blocking a collimated beam of light 102 shown in cross-section. Adjustment of attenuation is effected by linearly moving the opaque cone 101 in a direction of motion 103 in and out of the collimated beam of light 102. A disadvantage of this arrangement is that the direction of motion 103 must be maintained in precise alignment with the center of the collimated beam of light 102, such that the attenuation of one polarization 110 is matched by attenuation of the other polarization 120. The E and H denote the electric and magnetic field orientations of the respective polarizations.

In another example of prior art disclosed by Payne et al. (U.S. Pat. No. 6,801,354) is shown in FIG. 2. An adjustable optical attenuator 200 comprises a symmetrical array of circular apertures 203 in a membrane 202 forming a 2-D diffraction grating, which is employed to eliminate polarization dependent losses when attenuating a beam of incident light 201. FIG. 3 is a top view of an adjustable optical attenuator 300. A symmetrical array of circular apertures 302 forms a 2-D diffraction grating in a reflective silicon nitride membrane 301. Reflective posts 303 are disposed inside each circular aperture 302. By electrostatically raising or lowering the reflective silicon nitride membrane 301 with respect to the reflective posts 303 an attenuation of the beam of incident light reflected from the adjustable optical attenuator 300 is achieved. The circular shape of the apertures 302 is aimed at reducing PDL of the attenuation of the output reflected beam.

The fabrication of the adjustable optical attenuator 300 entails many deposition, photolithographic and etching steps, increasing the cost of manufacture. It also operates in reflection, complicating access to the attenuator output beam. There is no inherent latching property, as the removal of the electric drive voltage releases the electrostatic forces that displace the membrane, resulting in a return of the attenuation to some quiescent value.

In general, a linear response of attenuation to a control signal is normally preferred. A desired controllable attenuation range is up to 30 dB. Polarization dependent loss (PDL) is preferably below 0.2 dB within the 0 dB to 20 dB attenuation range. Wavelength dependent loss (WDL) is preferably 0.3 dB or less for the fiberoptic telecommunications C-band. For some applications, a variable attenuator is preferred, which retains its attenuation setting even if its power supply is turned off, i.e. having a latching property.

An object of the present invention to provide a variable optical attenuator with a widely controllable attenuation range of 30 dB while at the same time maintaining low PDL and low WDL.

It is a further object of this invention to provide a variable optical attenuator with a latching property.

Finally, it is another object of this invention to provide a variable optical attenuator with linear attenuation response to the driving signal.

SUMMARY OF THE INVENTION

Accordingly, the present invention relates to a variable optical attenuator comprising a filter with a plurality of alternating blocking stripes and linear apertures, wherein the blocking stripes are laid out in a zigzag pattern. The zigzag pattern is dimensioned to minimize polarization dependent loss of the filter.

Another feature of the present invention provides for a ratio of the stripe width and the aperture width to vary progressively with a distance from an end of the filter, so that a linear translation of the filter in a travel direction through an input optical beam results in a variation of attenuation level of an attenuated output optical beam.

Another aspect of the present invention relates to an actuator for linearly translating the filter through the input optical beam such that a loss of drive power to the actuator does not change the attenuation level, thus providing a latching feature.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
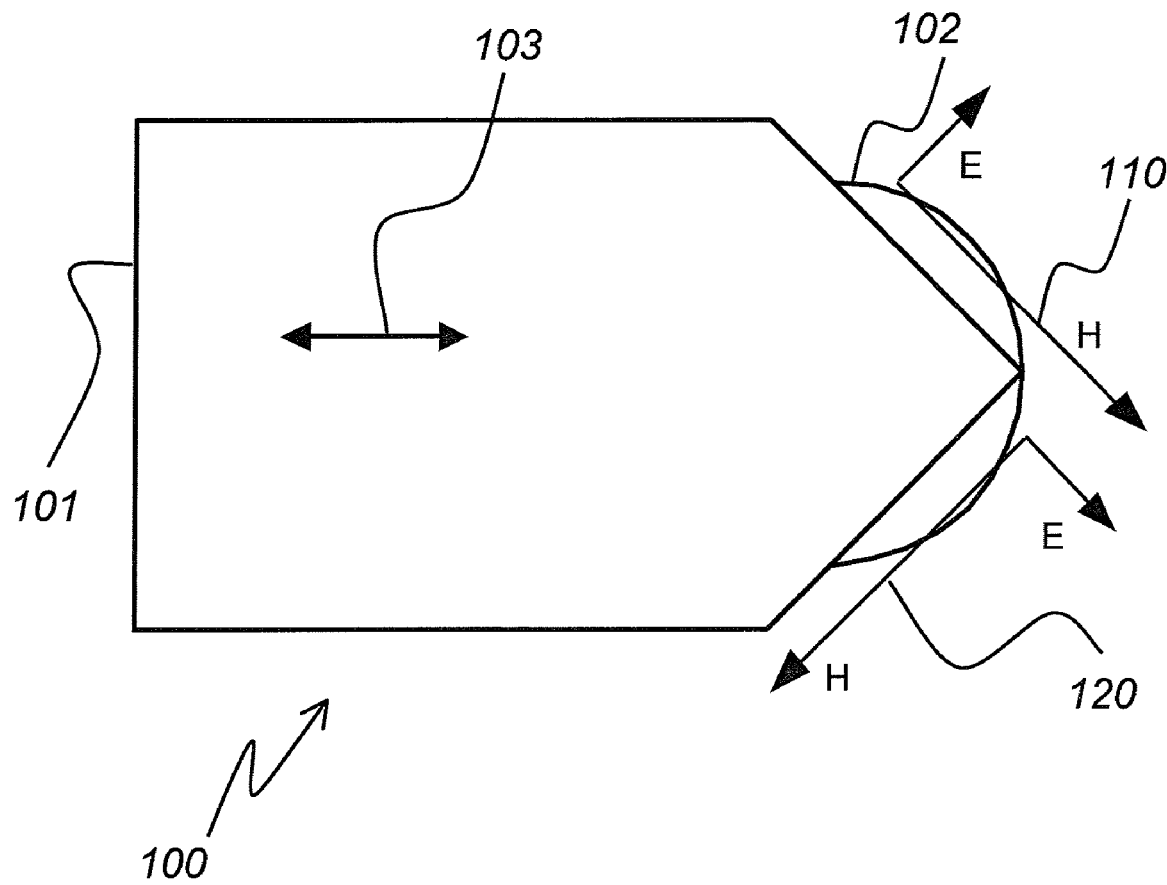
FIG. 1 is a diagram of prior art wedge-type adjustable optical attenuator.
Figure 2:
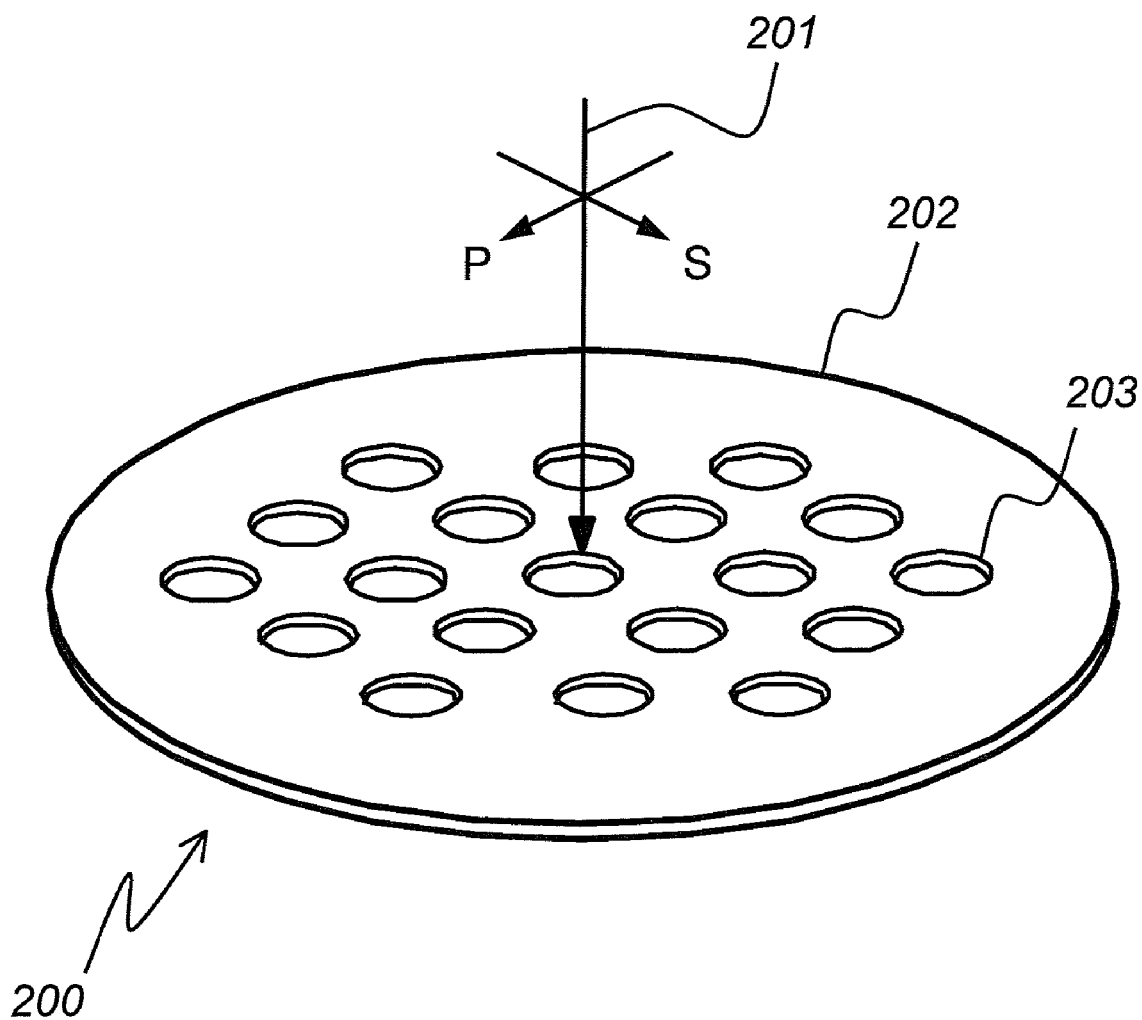
FIG. 2 is an isometric view of a prior art membrane with a 2-dimensional grating for low polarization dependence attenuation.
Figure 3:
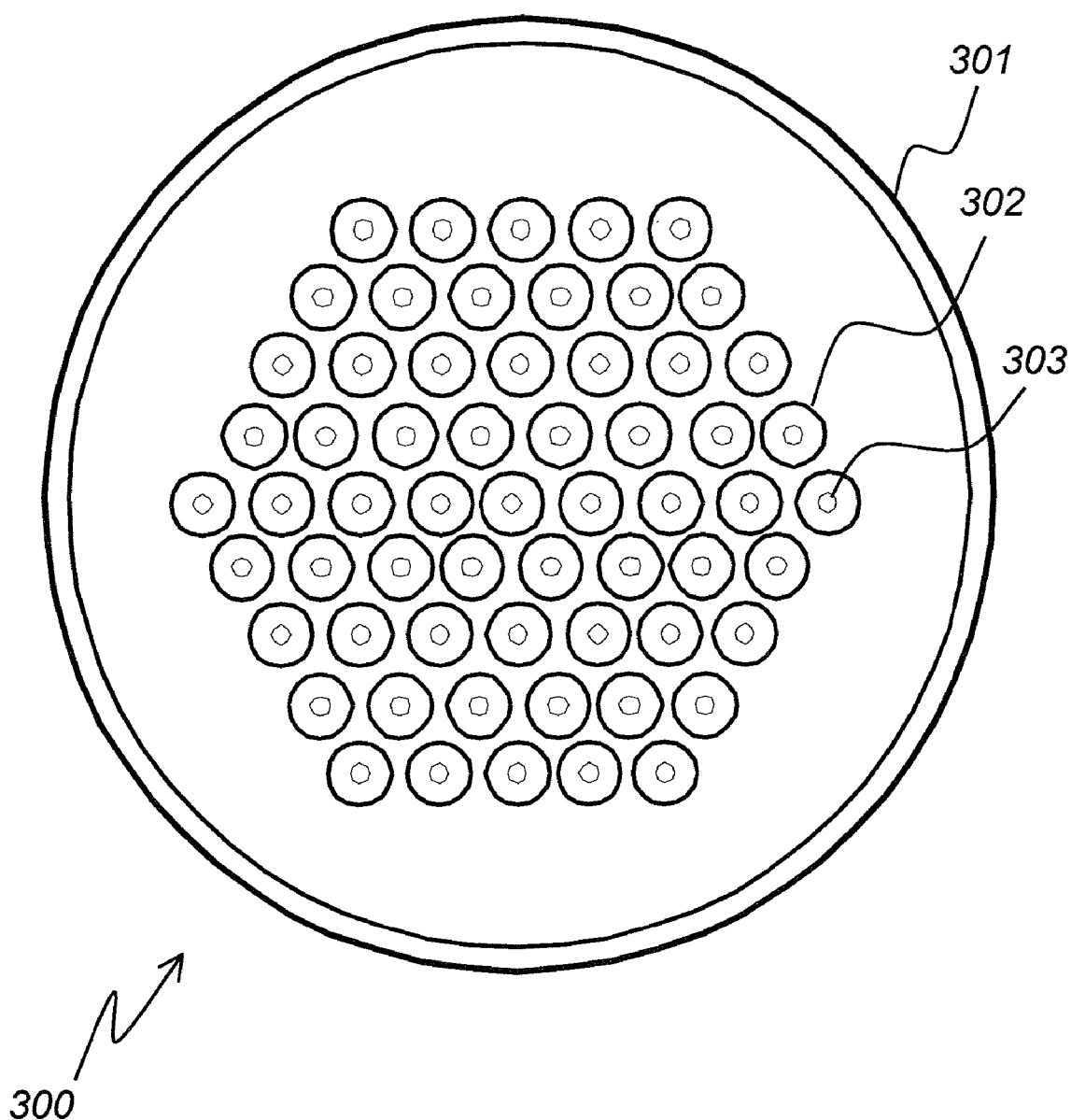
FIG. 3 is a top view of a prior art 2-dimensional grating for low polarization dependence attenuation.
Figure 4:
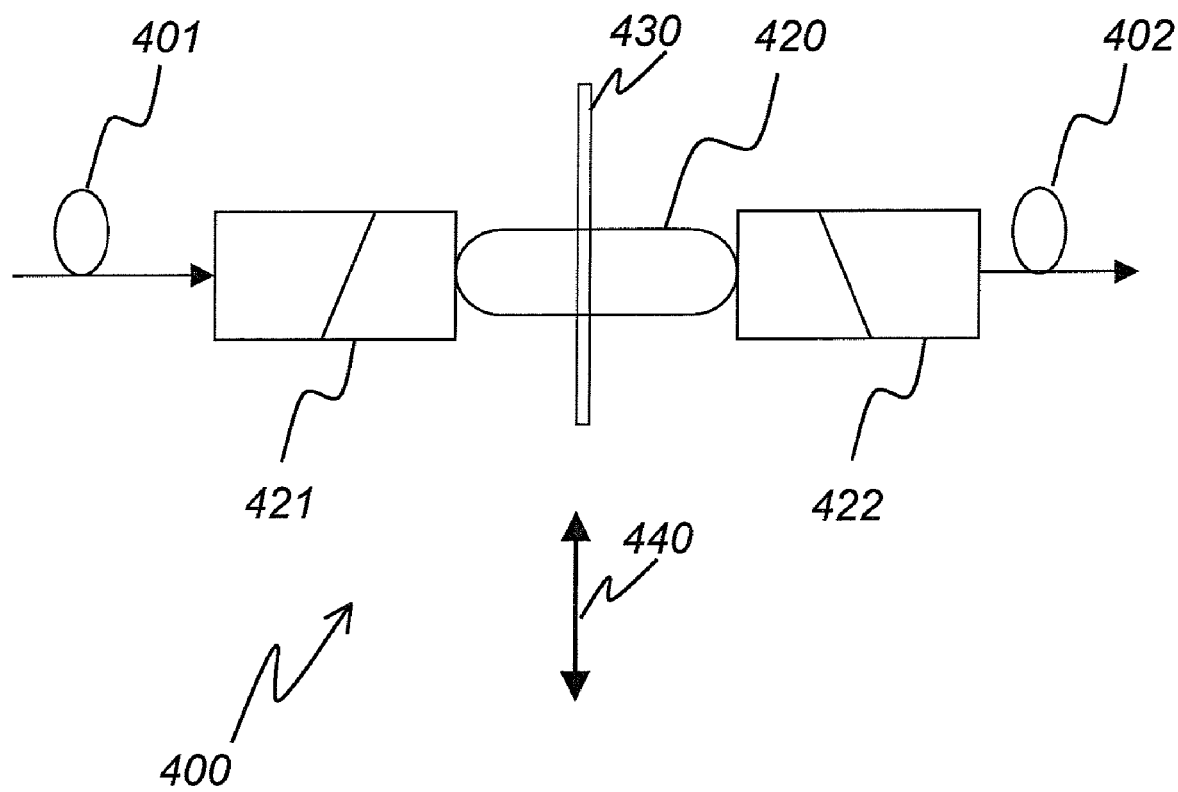
FIG. 4 is a schematic of variable optical attenuator according to the present invention.

An optical layout of an exemplary variable optical attenuator 400 is shown schematically in FIG. 4. Incoming light enters the variable optical attenuator 400 through an input optical fiber 401 and is collimated by collimating lens 421 to produce a collimated beam 420. A variable grating filter 430, which is movable in a travel direction 440 substantially perpendicular to the collimated beam 420, transmits a portion of the collimated beam 420 onto collimating lens 422 for focusing onto an end of an output optical fiber 402. The portion of collimated beam 420 that is transmitted can be varied by a linear position of the variable grating filter 430 along the travel direction 440. The input and output optical fibers 401, 402 can be replaced by slab waveguides, free-space optical beams or similar optical connections to an external optical system.

Figure 5:
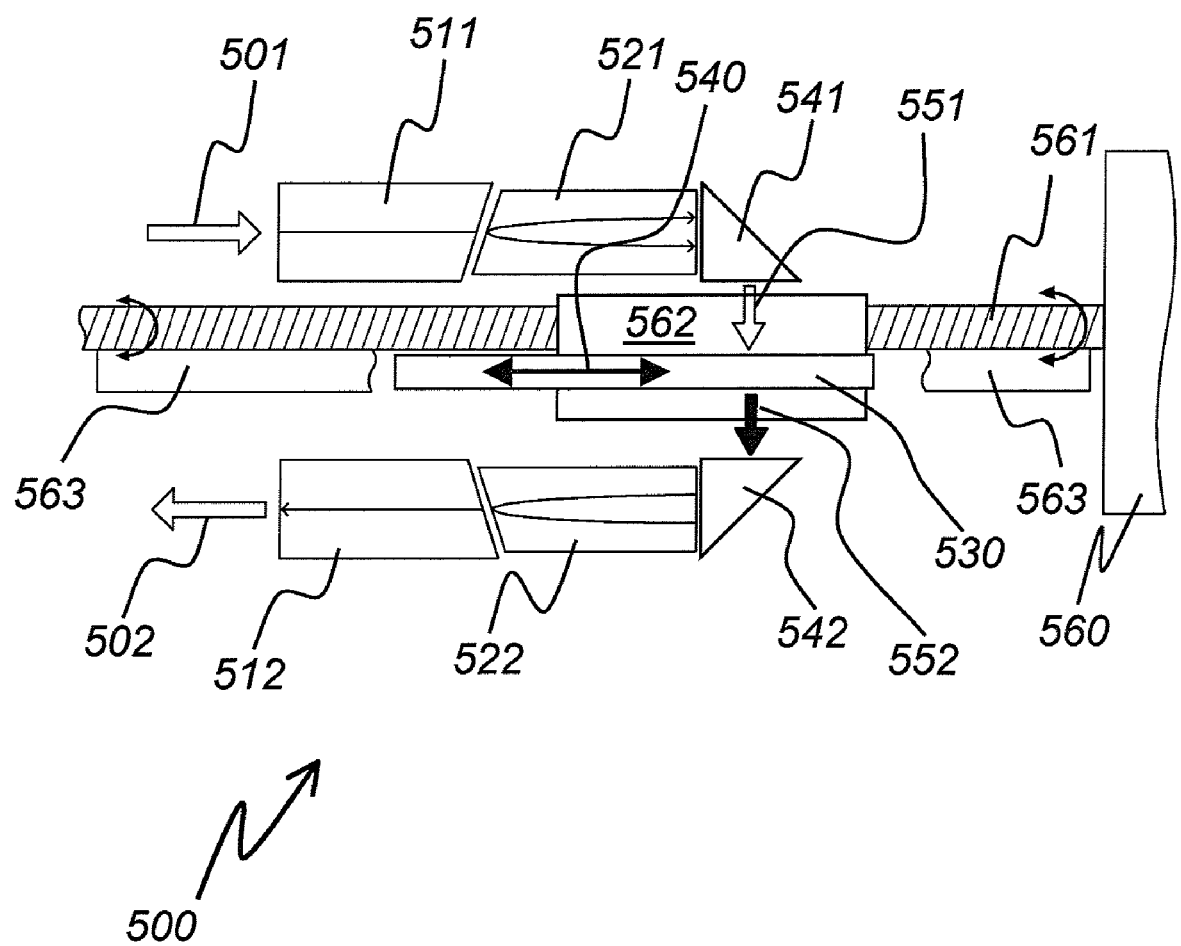
FIG. 5 is a detailed schematic of an embodiment of a variable optical attenuator.

FIG. 5 shows an embodiment of a variable optical attenuator 500 in greater detail. Incoming light enters the variable optical attenuator 500 through an input optical fiber 501, an end of which is held in position by tube 511. From the end of the optical fiber 501 the incoming light is collimated by collimating lens 521 and redirected by a first turning prism 541 into a collimated beam 551. The collimated beam 551 is incident at substantially normal incidence on variable grating filter 530, which transmits an attenuated beam 552, comprising a portion of the collimated beam 551, onto a second turning prism 542, thence to collimating lens 522 for focusing onto an end of output optical fiber 502 supported by a second tube 512. The output optical fiber 502 receives the focused attenuated beam 552 for transmission to other parts of an external optical system.

The properties of the variable grating filter 530 are designed so as to change the portion of the collimated beam 551 that gets transmitted as the attenuated beam 552 depending on an incidence distance of the collimated beam 551 on the variable grating filter 530 along filter travel direction 540. Thus a linear translation of the variable grating filter 530 along filter travel direction 540 results in a variable amount of attenuation of the collimated beam 551, which varies according to a distance and direction that the variable grating filter 530 is moved.

To achieve linear or approximately linear travel of the variable grating filter 530, several methods may be used. In the above example, a stepper motor 560 is utilized to provide rotation to a lead screw 561, to which filter holder 562 is engaged with a corresponding threaded section such that the rotation of the lead screw 561 produces a linear translation of the filter holder 562 along the travel direction 540. The filter holder 562 is prevented from rotating with the lead screw 561 by one or more guide pins 563 (only one shown). When drive current to the stepper motor 560 is switched off, the filter holder 562 supporting the variable grating filter 530 retains its position on the lead screw 561 thereby achieving a desired latching function.

In practical applications, the collimated beam 551 does not have to be perfectly collimated, nor does it have to be incident on the variable grating filter 530 at exactly normal incidence. Some angling may even be desirable for reducing deleterious effects due to back reflections from the variable grating filter 530 back into the input optical fiber 501, ultimately raising a return loss of the variable optical attenuator 500. The input optical fiber 501 and output optical fiber 502 may also comprise an optical slab waveguide, a free-space beam or other suitable optical connection to an external optical system.

Instead of the stepper motor 560, other types of actuator may be substituted, such as a Micro-Electro-Mechanical Systems (MEMS) actuator, to reciprocate, slide or move the variable grating filter 530 into various positions depending upon the amount of attenuation desired, either predetermined or controlled by a feedback control mechanism. With proper choice of actuator, when power to the actuator is cut, the variable grating filter 530 remains latched in position. Other types of mechanical latches are also possible.

The turning prisms 541 and 542 can be triangular prisms having long faces coated with a reflective coating or having a sufficiently high refractive index to provide total internal reflection. Alternatively, small mirrors may be used.

Figure 6:
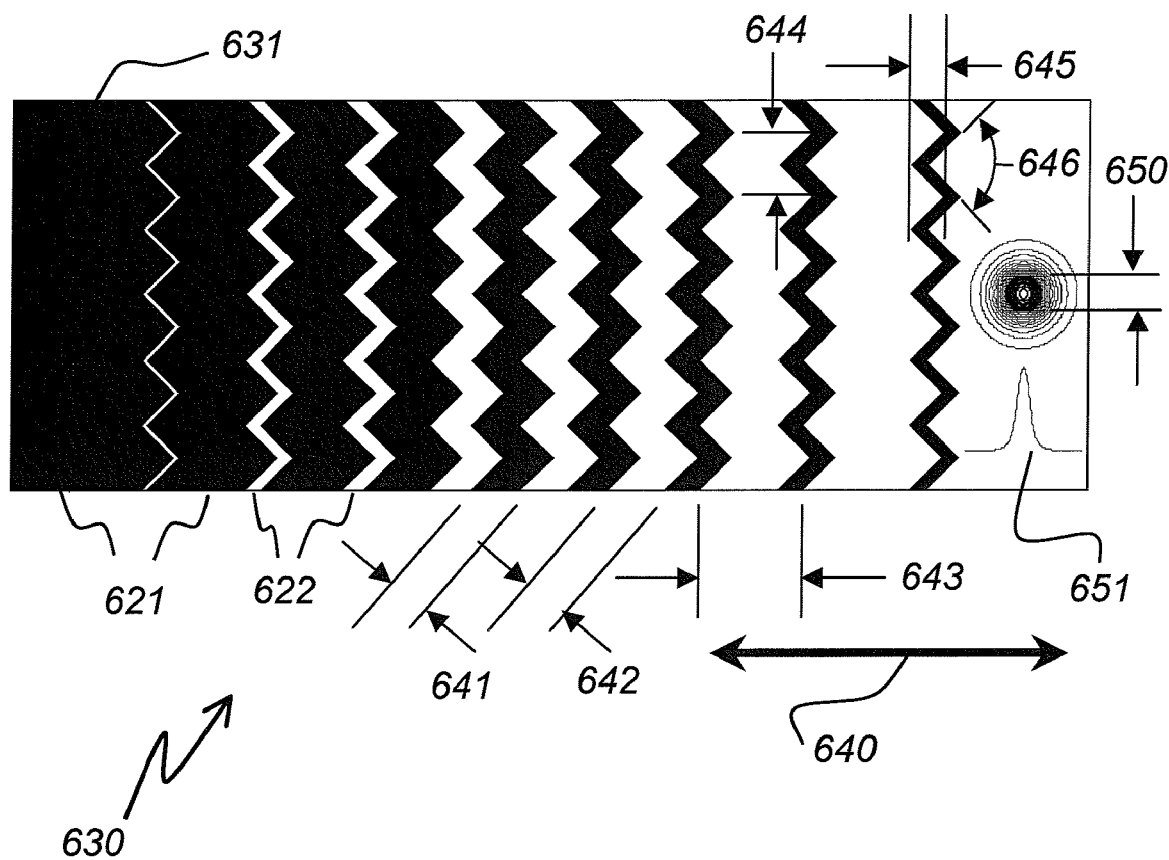
FIG. 6 is a top view of an embodiment of a linear variable grating filter (not to scale)

With reference to FIG. 6, details of an embodiment are shown of the variable grating filter 530, which is based on variable grating technology that is fabricated using semiconductor compatible processes. Variable grating filter 630 comprises a transparent substrate 631 having on one of its surfaces a plurality of zigzagging blocking stripes 621 alternating with zigzagging apertures 622 defined by serrated leading and trailing edges. The purpose of the serrated edges is to achieve equal blocking or attenuation of both polarizations of the collimated beam (551 in FIG. 5). Serration depth 645 must be optimized for reducing PDL and return loss of the variable grating filter 630. The serrations are defined by a series of teeth, each having an apex angle 646 between 80° and 100°, however 90° is preferred for optimal PDL. Serration pitch 644 is determined by the geometry of the serration depth 645 and the apex angle 646.

The apertures 622 are transparent to transmit light of a desired range of wavelengths. Anti-reflection coating on the apertures 622 may be used to reduce optical losses due to surface reflectivity of the transparent substrate 631. The blocking stripes 621 are either opaque or highly reflective so as to substantially block light of the desired range of wavelengths from getting transmitted. Gold, chromium, or aluminum are sample materials suitable for opaque coatings of the blocking stripes 621.

The collimated beam of light (551 in FIG. 5) is incident on the variable grating filter 630 at approximately normal incidence to form a beam spot 650 with an intensity profile 651. As the variable grating filter 630 is translated along filter travel direction 640 relative to the beam spot 650, blocking stripes 621 and apertures 622 can be brought into the beam spot 650 to varying amount, thereby blocking a portion of it from getting transmitted through the variable grating filter 630. An variably attenuated beam (552 in FIG. 5) is thus produced.

A ratio of areas of the blocking stripes 621 to the apertures 622 intersecting varies with distance along the filter travel direction 640 of the variable grating filter 630. For instance, the ratio of areas can be varied by reducing stripe width 641, increasing aperture width 642, or a combination of both in a direction along the filter travel direction 640. Stripe pitch 643 (the spacing between two adjacent blocking stripes 621) is optimized for both a slope (resolution) of attenuation against travel distance of the variable grating filter 630 and a return loss affected by reflecting diffraction.

Light passage through the variable optical attenuator 500 consists mainly of two components—blocking loss and the mode mismatch loss.

Assuming that the power distribution of light incident on the variable grating filter 630 has a Gaussian function, it can then be expressed as:

$$\phi_1(x, y) = A_0 \exp\left(-\frac{x^2 + y^2}{\omega^2}\right) \exp[j\varphi(x,y)] \quad (1)$$

where $A_0$ and $\omega$ are field amplitude and optical beam waist radius respectively, $\phi$ is the angle phase.

The pattern formed by the blocking stripes 621 can be described by a door function door (x, y). Thus, the loss, $IL_1$, of the light due only to the blocking stripes 621 can be obtained:

$$IL_1 = \frac{\int\int (\phi_1(x,y) * \text{door}(x,y))(\phi_1(x,y) * \text{door}(x,y)) * ds}{\int\int (\phi_1(x,y))(\phi_1(x,y)) * ds} \quad (2)$$

After passing through the variable grating filter 630, light is coupled into the optical output 502, such as optical fiber, the mode distributions through the variable grating filter 630 and the optical output 502 are different and may cause coupling loss due to mode mismatch. The mismatch coupling efficiency can be written as follows:

$$\eta = \frac{\left|\int_{-\infty}^{\infty} FT(\phi_1'(x,y)) \cdot FT(\phi_1(x,y)) * ds\right|^2}{\int_{-\infty}^{\infty} |FT(\phi_1'(x,y))|^2 ds \cdot \int_{-\infty}^{\infty} |FT(\phi_1(x,y))|^2 ds} \quad (3)$$

where $\phi_1'$ is the mode distribution of the light, $FT(\phi_1')$ and $FT(\phi_1)$ are the Fourier transform of the light through lens and fiber, respectively. Based on Parseval's theory, equation (3) can be rewritten as:

$$\eta = \frac{\left|\int_{-\infty}^{\infty} \phi_1'(x,y) \cdot \phi_1(x,y) * ds\right|^2}{\int_{-\infty}^{\infty} |\phi_1'(x,y)|^2 ds \cdot \int_{-\infty}^{\infty} |\phi_1(x,y)|^2 ds} \quad (4)$$

Thus, the mode mismatch coupling loss can be calculated as:

$$IL_2 = -10 \log 10^{\eta} \quad (5)$$

Ignoring the small loss from the lens and the fiber, we have the total loss as a sum of the blocking loss and the mode mismatch loss:

$$IL = IL_1 + IL_2 \quad (6)$$

An advantage of this technology is that the door function can be tailored to realize an attenuation characteristic according to a desired function of travel distance of the variable grating filter 630.

An important factor during the design of the variable grating filter 630 is the appropriate consideration of the transmittance of the blocking stripes 621, which are required to have a sufficiently low transmittance or sufficiently high rejection of light. Even a small portion of light passing through the blocking stripes 621 may interfere with the light passing through the apertures 622. This interference can generate periodic ripples in the wavelength spectrum, which will increase the wavelength dependent loss (WDL). The effect is especially noticeable at higher attenuation settings, where the power difference between light leaking through the blocking stripes 621 and light transmitted through the apertures 622 is smaller. The effect is not so pronounced at lower attenuation settings.

Thus a loss of more than 45 dB for the blocking stripes 621 is normally desired. This can be achieved by coating the blocking stripes 621 with a thick layer of opaque material. Alternatively a multilayer dielectric coating can be applied to make the blocking stripes 621 highly reflective.

Figure 7:
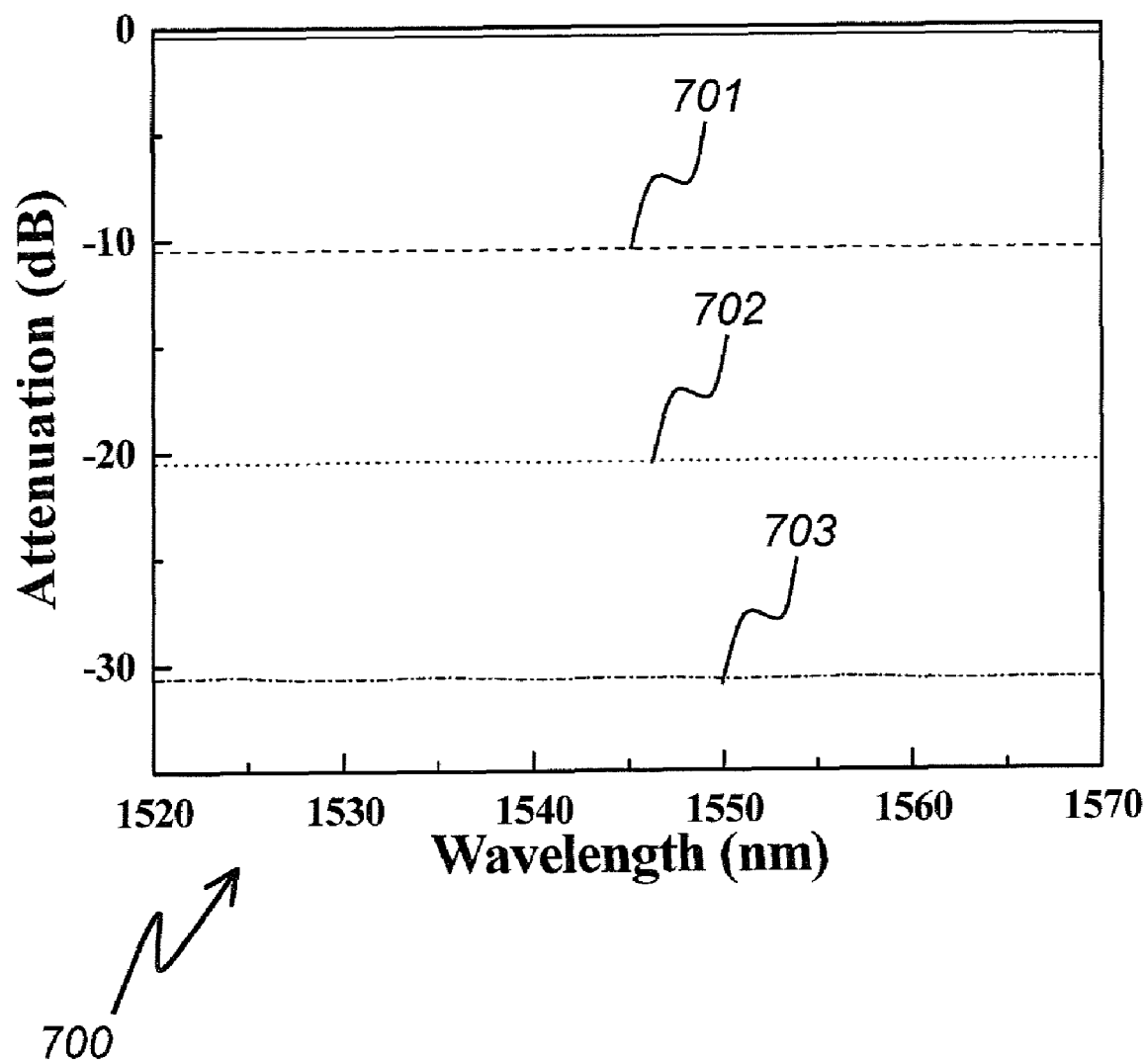
FIG. 7 is a graph of wavelength dependent loss spectra for three different attenuation settings.

FIG. 7 presents wavelength dependent loss (WDL) spectra 700 for three nominal attenuation settings: 10 db (701), 20 dB (702) and 30 dB (703). A WDL of 0.3 dB or less is evident over the fiberoptic telecommunications C-band, which corresponds to a wavelength range from 1520 nm to 1570 nm. In any 2 nm band, the WDL is below 0.1 dB.

Figure 8:
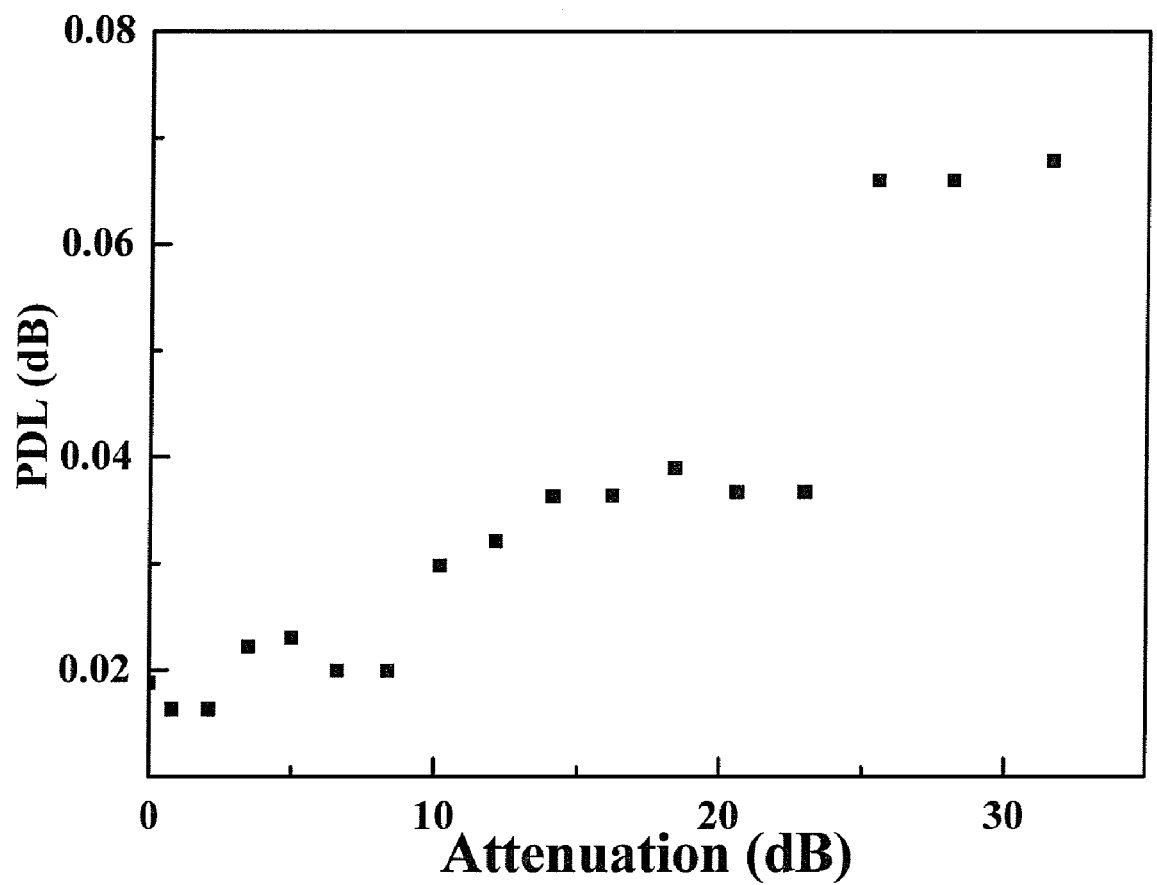
FIG. 8 is a graph of polarization dependent loss as a function of attenuation.

Measured low values of PDL according to the present invention are plotted in FIG. 8. The PDL is less than 0.10 dB over the full attenuation range of 0 dB to 32 dB. The PDL decreases as the attenuation setting is lowered.

We claim:

1. A variable optical attenuator comprising:
    an input port for receiving an input optical beam;
    a filter, comprising a transparent substrate with a plurality of alternating blocking stripes and linear apertures distributed between a first end and a second end of the transparent substrate, the filter disposed within the input optical beam such that at least one blocking stripe blocks a portion of the input optical beam and at least one linear aperture transmits an attenuated optical beam having an attenuation value; and
    an output port for outputting the attenuated optical beam;
    wherein the blocking stripes are laid out in a zigzag pattern with serrations on a leading and trailing edge, each blocking stripe having a stripe width and separated from a neighboring blocking stripe by an aperture width;
    wherein the filter has a travel direction directed from the first end to the second end; and
    wherein a ratio of the stripe width to the aperture width progressively increases with a distance from the first end along the travel direction.

2. The variable optical attenuator in claim 1, further comprising a guide pin for constraining the filter to move in a substantially linear direction along the travel direction.

3. The variable optical attenuator in claim 1, further comprising a lens for collimating the input optical beam through the filter.

4. The variable optical attenuator in claim 1, wherein the blocking stripes comprise an opaque coating on the substrate.

5. The variable optical attenuator in claim 4, wherein the opaque coating is selected from the group consisting of gold, chromium, and aluminum.

6. The variable optical attenuator in claim 1, wherein the blocking stripes comprise a highly reflective coating on the substrate.

7. The variable optical attenuator in claim 6, wherein the highly reflective coating comprises a multi-layer dielectric interference coating.

8. The variable optical attenuator in claim 1, wherein the transparent substrate is coated with an anti-reflection coating.

9. The variable optical attenuator in claim 2, further comprising an actuator for moving the filter along the travel direction to increase or decrease the attenuation value.

10. The variable optical attenuator in claim 9, wherein the actuator comprises a stepper motor for rotating a lead screw and a filter holder engaged with a thread of the lead screw for causing the filter to advance or retract in a substantially linear direction, the filter holder prevented from rotation by the guide pin.

11. The variable optical attenuator in claim 9, wherein the actuator comprises a Micro-Electro-Mechanical Systems (MEMS) device for causing the filter to advance or retract in a substantially linear direction.

12. The variable optical attenuator in claim 1, wherein the serrations are defined by a series of teeth, each having an apex angle between 80 and 100 degrees.

13. The variable optical attenuator in claim 12, wherein the apex angle is substantially 90 degrees.

14. The variable optical attenuator in claim 1, wherein the input port further comprises:

a first tube for holding an end of an input optical fiber;
a first lens for collimating the optical input beam; and
a first turning prism for directing the collimated beam onto the filter; and wherein the output port further comprises:

a second tube for holding an end of an output optical fiber;
a second lens for focusing the attenuated optical beam onto the end of the output optical fiber; and
a second turning prism for directing the attenuated optical beam onto the second lens.

* * * * *